J. R. CHAMPLIN
Ice-Cream Freezer.
No. 55,820.  Patented June 26, 1866.
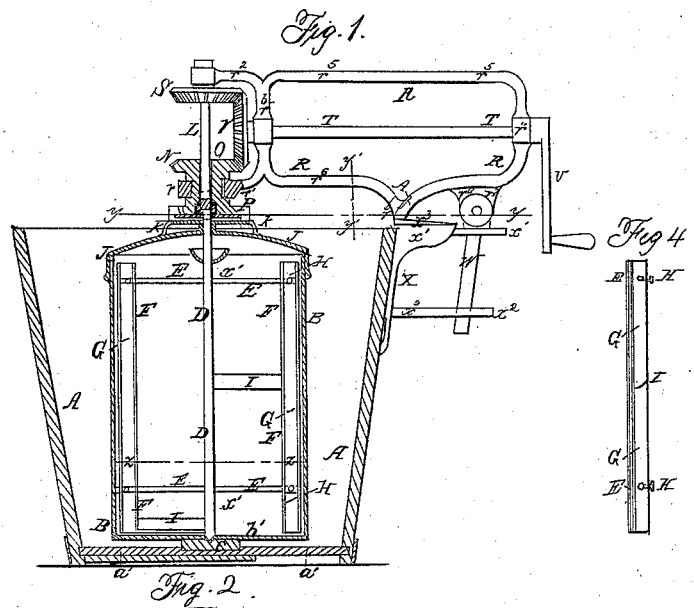
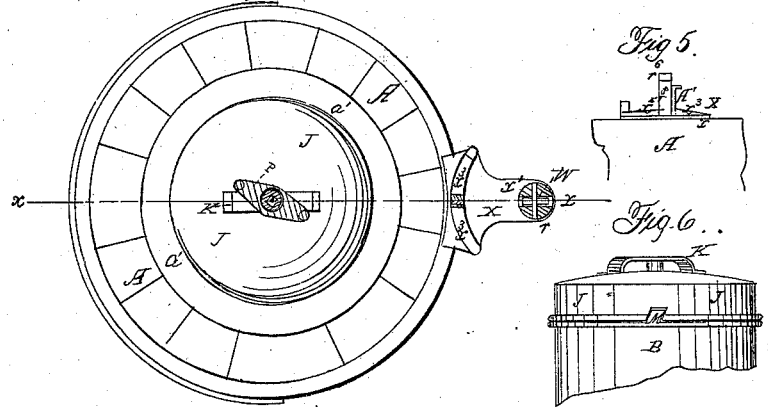

UNITED STATES PATENT OFFICE.

JOHN R. CHAMPLIN, OF LACONIA, NEW HAMPSHIRE.

IMPROVED ICE-CREAM FREEZER.

Specification forming part of Letters Patent No. 55,820, dated June 26, 1866.

*To all whom it may concern:*

Be it known that I, JOHN R. CHAMPLIN, of Laconia, Belknap county, State of New Hampshire, have invented a new and useful Improvement in Ice-Cream Freezers; and I do hereby declare that the following is a full, clear, and exact description thereof, which will enable others skilled in the art to make and use the same, reference being had to the acccompanying drawings, forming part of this specification, in which—

Figure 1 is a vertical section of my improved ice-cream freezer, taken through the line $x\,x$, Fig. 2. Fig. 2 is a top view of the same, partly in section, through the line $y\,y$, Fig. 1. Fig. 3 is a detail sectional view of the same, taken through the line $z\,z$, Fig. 1. Fig. 4 is a detail sectional view of the same, taken through the line $x'\,x'$, Fig. 1. Fig. 5 is a detail sectional view of the same, taken through the line $y'\,y'$, Fig. 1. Fig. 6 is a detail view of the upper part of the cream-holder.

Similar letters of reference indicate like parts.

My invention has for its object to improve the construction of my ice-cream freezer, patented November 1, 1864; and it consists, first, of the side scrapers made in the form and adjusted in the manner hereinafter described, in combination with the horizontal arms of the beater; second, in the frame that supports the gearing, and the support to which the said frame is pivoted, in connection with each other and with the gearing, as hereinafter more fully described.

A is the ice-holder, which is made in the ordinary form and manner. B is the cream-holder, from the central point of the bottom $b$ of which projects a point by which it is pivoted to the block C, attached to the bottom $a'$ of the ice-holder A, as shown in Fig. 1.

D is the beater-shaft, the lower end of which enters and revolves in a depression formed in the center of the bottom $b'$ of the cream-holder B, as shown in Fig. 1.

E are the horizontal arms of the beater, which are of such a length as to revolve within the cream-holder B.

F are vertical arms attached to the horizontal arms E, as shown. Upon the ends of the arms E are placed the scrapers G. These scrapers are secured in place upon the arms E by the set-screws H, as shown in Figs. 1, 3, and 4, so that they may be readily adjusted, as required. The scrapers G are made scoop-shaped, as shown in Fig. 3, so that they may remove the cream from the outer part of the cream-holder toward the central part, giving the unfrozen cream a better chance to flow outward toward the colder part of the holder B.

I are scoop-shaped lifters attached to the shaft D and to the vertical arms F of the beater, for the purpose of lifting the cream upward while freezing, and thereby increasing its bulk. The drawings represent two of these lifters as attached to the beater; but their number may be increased if desired, and in large freezers it would be necessary.

The upper end of the shaft D passes up through the cover J, and through the handle K of said cover, as shown, and terminates in a square end, which fits into a socket formed in the lower end of the shaft L, as shown.

The cover J is kept from revolving upon the cream-holder B by the catches M, formed upon the said holder, and fitting into notches formed in the lower edges of the cover J, as shown in Fig. 6.

M is a bevel-gear wheel attached to the sleeve O, the lower end of which sleeve terminates in a clutch, P, which revolves in the cream-holder B by taking hold of the cover K, as shown in Fig. 1. The sleeve O revolves upon the shaft L, and also in bearings in the arm $r'$ of the frame R, as shown.

S is a bevel-gear wheel attached to the shaft L and revolving with it. The shaft L revolves in bearings in the arm $r^2$ of the frame R, and said shaft and its attachments are supported by said arm.

T is a shaft revolving in bearings in the frame R, as shown. To one end of this shaft is attached a crank, U, by which motion is communicated to the freezer, and to its other end is attached a bevel-gear wheel, V, meshing into both the bevel-gear wheels S and N, causing them, and with them the beater and cream-holder, to move with equal velocities in opposite directions.

The frame R is made as shown—that is to say, with end bars, $r^3$ and $r^4$, in which are the bearings for the shaft T, with projecting end arms, $r^2$ and $r'$, which furnish bearings for the shaft L and sleeve O, with an upper or top bar, $r^5$, which strengthens the frame and furnishes a handle by which the frame may be moved, and with a lower bar, $r^6$. Upon the lower rear part of the bar $r^6$ is formed an ear, $r^7$, by means of which the frame R is hinged to the head of the bolt W, by which the said frame is pivoted to the support X.

The bolt W passes through holes formed in the arms $x'$ and $x^2$ of the support X, and is kept from being withdrawn from said holes by a projection or pin on one side of said bolt, below the arm $x^2$, as shown in Fig. 1; but by revolving the frame R through half a circle it can then be lifted from the support X, the projection or pin passing up through slots formed in the sides of the holes through the arms $x'$ and $x^2$.

The central bar, $r^6$, projects down so as to form an arm, $r^8$, which supports the forward end of the frame by resting upon the support X.

$x^3$ is a circular inclined plane formed upon the upper part of the arm $x'$, as shown in Fig. 5. The central or highest part of the inclined plane is cut away or notched, so that when the frame may reach that point it may drop down and clutch the beater and cream-holder, and be in a position to revolve them, as before described. The side of the arm $r^2$ and the side of the notch into which it drops are grooved, so that by forcing the frame a little to one side these grooves may interlock, in which position it is held by a key, A, pivoted to the side of the arm $r^8$, and which fits into said notch at the side of the arm $r^8$.

The support X may be attached to the side of the ice-holder A, as represented in Figs. 1 and 2; but in some cases, and especially in the case of large freezers, it may be advisable to attach the support X to a stationary framework, allowing the different parts of the machine to be more easily moved when necessary.

I claim as new and desire to secure by Letters Patent—

1. The side scrapers, G, when made in the form and adjusted in the manner described, in combination with the horizontal arms E of the beater, substantially as and for the purpose set forth.

2. The frame R and support X, when constructed substantially as described, in combination with each other and with the shafts T and L, as and for the purpose set forth.

3. The use of a combined joint and swivel for coupling the gearing to the beater and cream-holder of an ice-cream freezer, substantially as described.

4. The coupling device herein described, in which the coupling is accomplished by dropping the clutch upon the shaft and cream-holder, substantially as described, and for the purpose set forth.

JOHN R. CHAMPLIN.

Witnesses:
E. A. HIBBARD,
N. J. EDGERLY.